(12) United States Patent
Brown et al.

(10) Patent No.: US 6,343,432 B1
(45) Date of Patent: *Feb. 5, 2002

(54) ANIMAL DECOY

(75) Inventors: Christopher James Brown, Edina, MN (US); Darrell Michael Grams, Cambria, WI (US)

(73) Assignee: H&D Acquisition Company, Inc., Greenville, NC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,710

(22) Filed: Aug. 6, 1998

(51) Int. Cl.[7] .............................................. A01M 31/06
(52) U.S. Cl. ..................................................... 43/3; 43/2
(58) Field of Search ............................................ 43/2, 3

(56) References Cited

U.S. PATENT DOCUMENTS

| | | | |
|---|---|---|---|
| 282,851 A | | 8/1883 | Danz, Jr. |
| 364,573 A | | 6/1887 | Brinkop |
| 1,663,009 A | * | 3/1928 | Johnson .......................... 43/3 |
| 2,011,480 A | | 8/1935 | Gazalski et al. |
| 2,453,758 A | * | 11/1948 | Risch .............................. 43/3 |
| 2,746,196 A | | 5/1956 | Karr |
| 2,763,952 A | * | 9/1956 | Bruce ............................. 43/3 |
| 3,029,541 A | * | 4/1962 | Palmer ............................ 43/3 |
| 3,707,798 A | | 1/1973 | Tryon |
| 4,450,642 A | | 5/1984 | DeKezel et al. |
| D282,851 S | | 3/1986 | Tornese ...................... D17/18 |
| 4,845,872 A | * | 7/1989 | Anderson ....................... 43/3 |
| 4,885,861 A | * | 12/1989 | Gazalski ......................... 43/3 |
| 4,890,408 A | * | 1/1990 | Heiges et al. ................... 43/3 |
| 5,293,709 A | | 3/1994 | Cripe |
| D364,573 S | | 11/1995 | Pearsall ..................... D10/50 |
| 6,115,953 A | * | 9/2000 | Wise ............................... 43/2 |

FOREIGN PATENT DOCUMENTS

GB          2 247 819 A        3/1992

OTHER PUBLICATIONS

PCT/US/17904 International Search Report dated Nov. 3, 1999.

* cited by examiner

Primary Examiner—Kurt Rowan
(74) Attorney, Agent, or Firm—Kilpatrick Stockton LLP

(57) ABSTRACT

The present invention includes a method for making a realistic three-dimensional animal decoy. The method includes steps of photographing an array of views of an animal that is to be the subject of the decoy. The photographic views are arranged to make a flattened, aerial view of the animal. A screen is prepared that receives the view. The screen is positioned over a three-dimensional vacuum mold, and, with application of heat and pressure, is permanently formed into a three-dimensional animal shell decoy that has photographically realistic features.

11 Claims, 4 Drawing Sheets

ANIMAL DECOY

BACKGROUND OF THE INVENTION

The present invention relates to an animal decoy and to a method for making an animal decoy.

Many hunters, such as duck and goose hunters, have, over time, come to believe that the more realistic the appearance of a duck or goose decoy, the greater the probability that a living duck or goose will be attracted to the decoy. This belief has driven decoy developments that have included movable decoy components to simulate duck or goose positions that are feeding or resting; multiple light-weight decoys that simulate a flock of ducks or geese; and floatable decoys to simulate animals' swimming action.

The Cripe patent, U.S. Pat. No. 5,293,709, issuing Mar. 15, 1994, describes a duck decoy that includes a flat decoy body and a photographic duck image on a surface of the flat decoy body. The surface of the flat decoy body is treated with a corona discharge. Ultraviolet inks transfer the photographic image to the treated decoy body. An outer coat of transparent ultraviolet ink with silica particles is applied. The silica particles impart a low reflectivity to the image.

SUMMARY OF THE INVENTION

One embodiment of the present invention includes a method for making a three-dimensional animal decoy with realistic photographic detail. The method includes photographing an array of views of an animal that is to be the subject of the decoy. The photographic views are arranged to make a flattened, three-dimensional aerial body view of the animal. A screen template is prepared that receives the aerial body view by transferring an image of the aerial view onto the screen template. The aerial body view on the screen template is transferred to one or more polymeric sheets by screen printing. A mold is prepared having the three-dimensional shape of the body of the animal which is the subject of the decoy. The polymeric sheet, with the flattened, two-dimensional aerial view, is positioned over the three-dimensional mold and, with application of heat and pressure, is permanently formed into a body of a three-dimensional animal decoy that has photographically realistic features. The present invention also includes a decoy made by this method.

One other embodiment of the present invention comprises a three-dimensional animal decoy body having photographic, realistic details. The animal decoy is comprised of an outer polymeric shell enclosing a volume of space, shaped like a body of the animal. The polymeric shell is printed with features of the animal that has been photographed.

An additional embodiment of the present invention includes a kit that comprises a decoy main body, the main body illustrated with animal features having photographic detail. The kit also comprises a decoy head that is attachable to the main body.

DETAILED DESCRIPTION OF PREFERRED EMBODIMENTS

Figure 1:
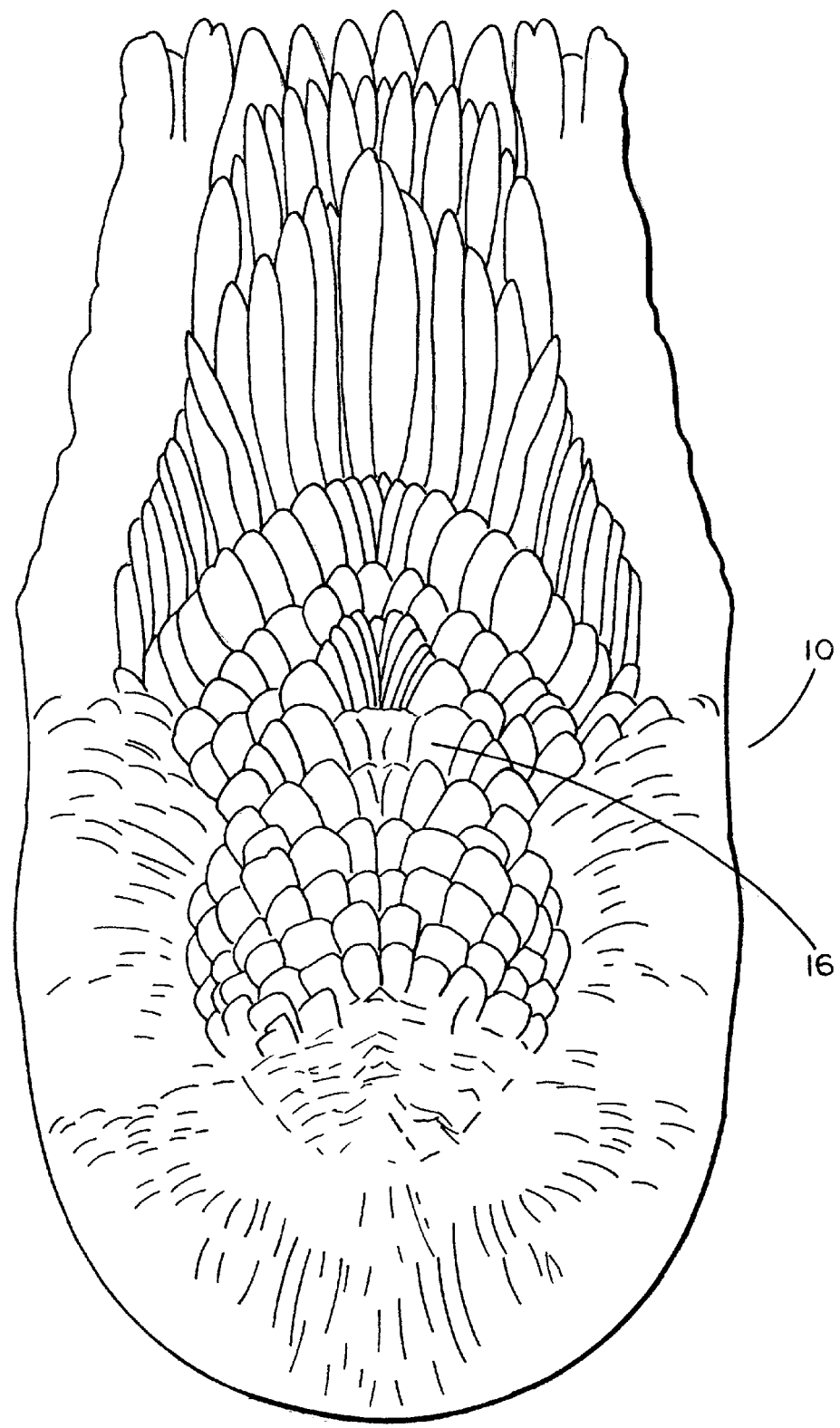
FIG. 1 illustrates a top plan representational view of a single aerial photographic image used to make the decoy of the present invention, the view comprising individual photographic views of a living animal, such as a Blue Goose.
Figure 2:
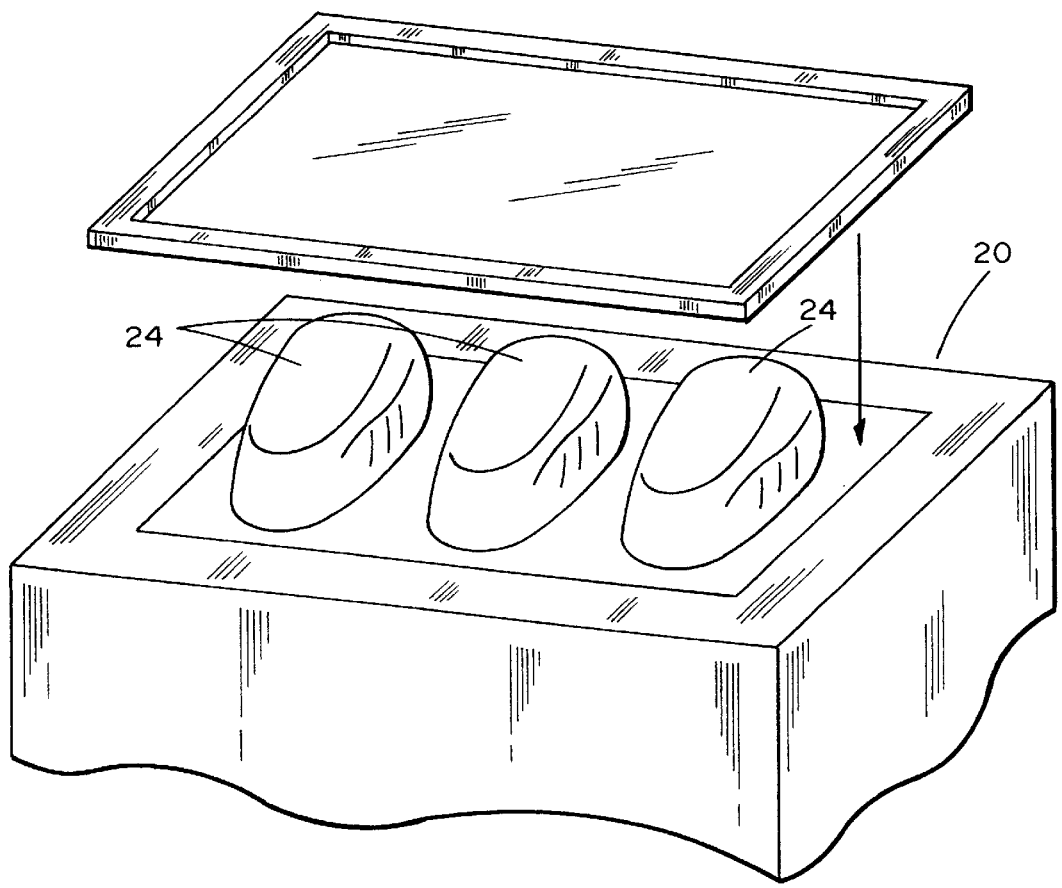
FIG. 2 illustrates a perspective view of one embodiment of a three dimensional vacuum mold to which the aerial image is applied to make the decoy of the present invention.
Figure 3A:
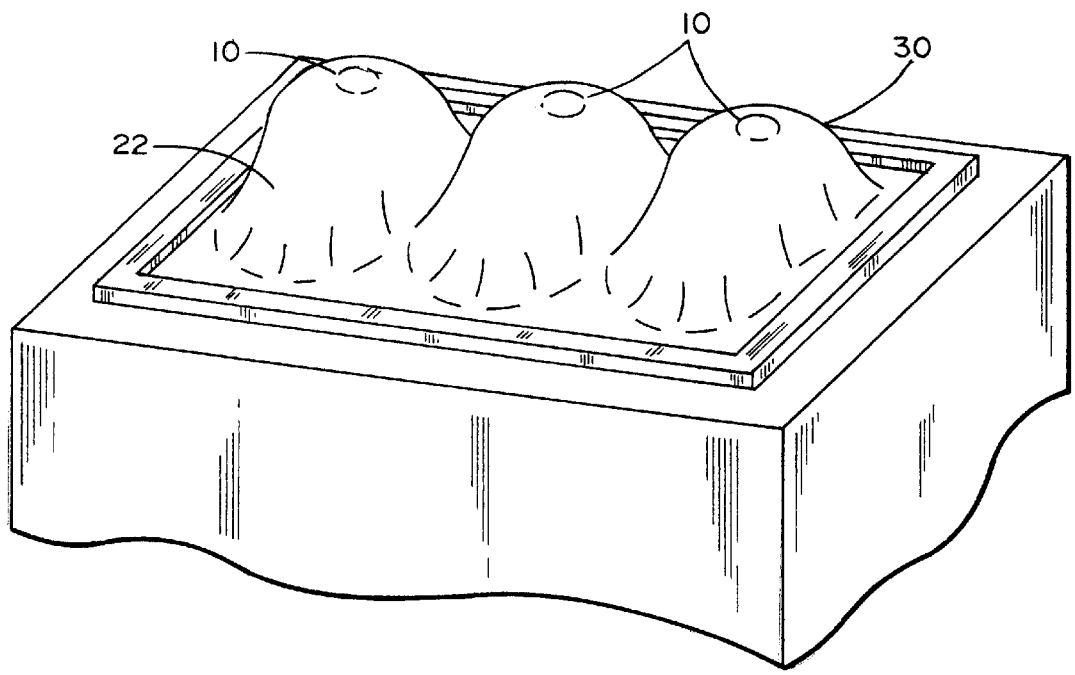
FIG. 3a illustrates a perspective view of a plastic sheet partially molded by the form to make a decoy body.
Figure 3B:
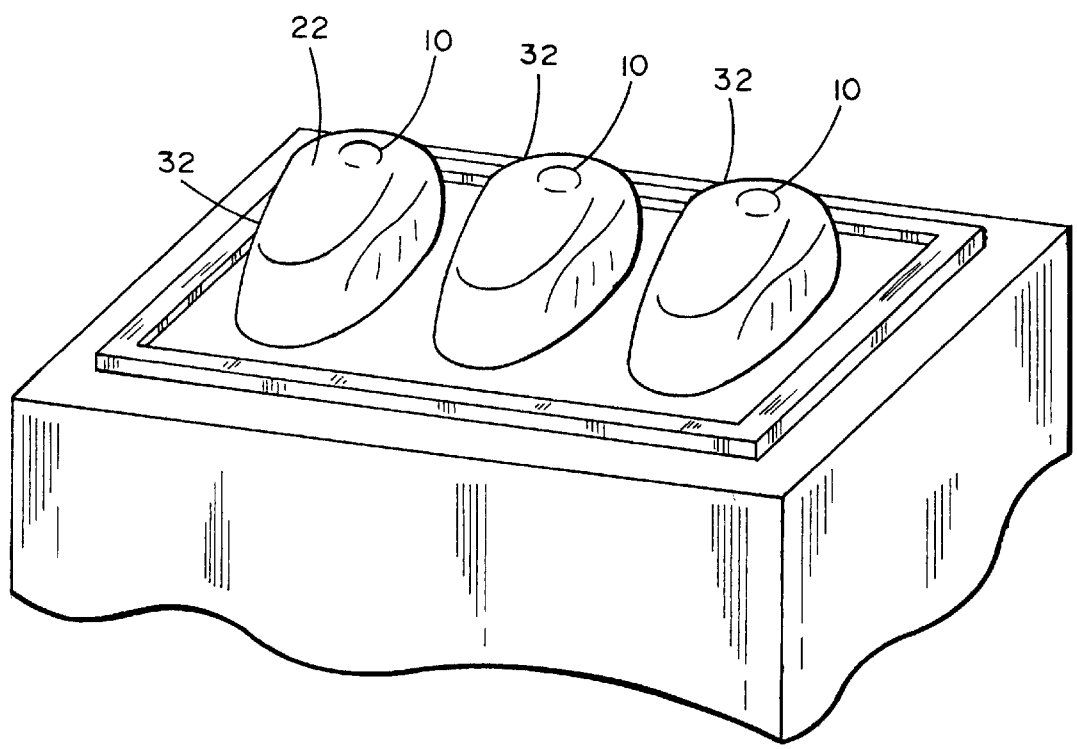
FIG. 3b illustrates a perspective view of a plastic sheet which has been molded by the form to make the decoy body.

A method of the present invention, for making a realistic three-dimensional animal decoy, comprises photographing an array of two-dimensional views of an animal that is to be the subject of the decoy; arranging and adjusting the photographic views of the array to make a three-dimensional, flattened aerial view of the animal such as is illustrated at 10 in FIG. 1, for a Canada goose; printing a screen template with at least one image of the aerial view 10; providing a three-dimensional vacuum mold 24 having a shape of the body of the animal which is the subject of the decoy as is illustrated at 20 in FIG. 2; printing the aerial view image 10 imparted to the screen template onto a polymeric sheet 22; applying the polymeric sheet 22 to the vacuum mold 24 so that the three dimensional feature representations of the aerial view image 10 on the sheet 22 will correspond to their positions on a live animal body once the fabrication is complete; heating the polymeric sheet 22 to soften the polymeric material of the sheet such as is shown at 30 in FIG. 3a; and applying pressure to the heated sheet in order to make a three-dimensional animal shell decoy body that has multiple, photographic, realistic details of a living animal, such as is shown at 32 in FIG. 3b.

Figure 4:
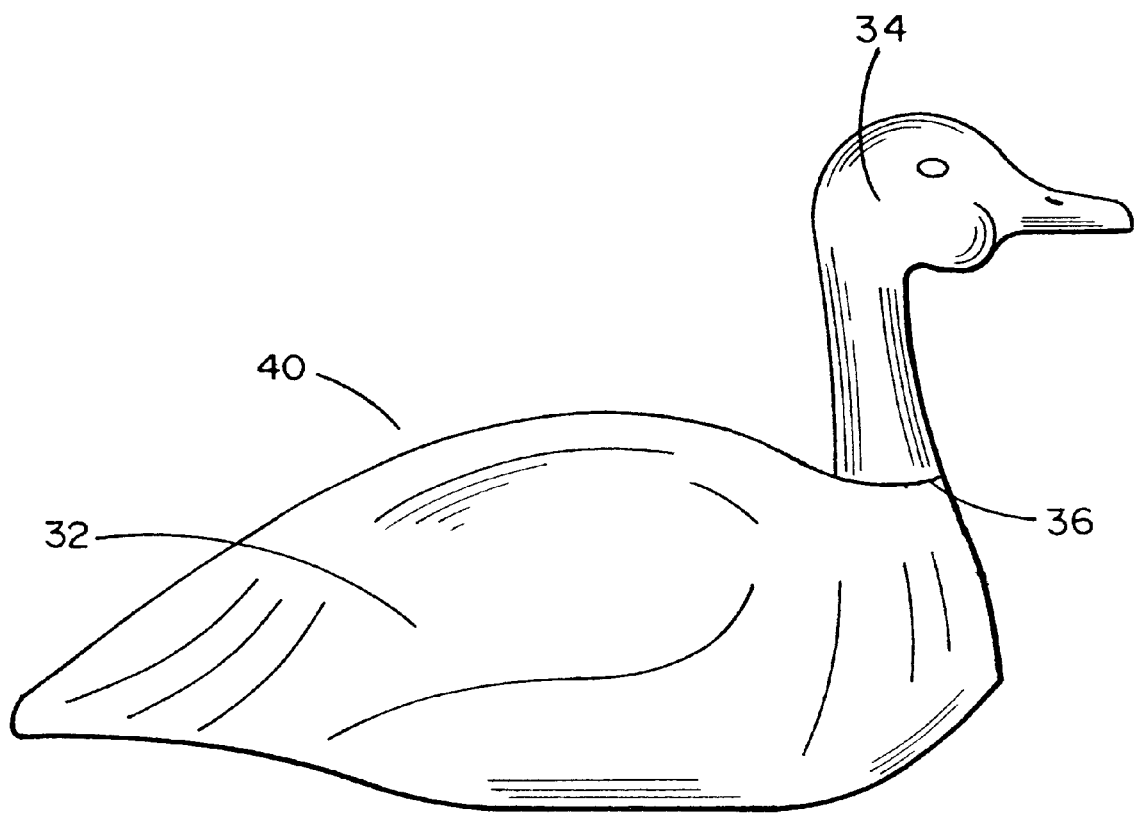
FIG. 4 illustrates a perspective view of one embodiment of the animal decoy of the present invention.

The present invention also includes the three dimensional animal decoy body 32 that has photographically realistic features. The decoy body 32 is comprised of a polymeric shell that is resistant to damage from elements of the out-of-doors, such as ultraviolet light. The decoy body 32 may be one of a variety of animals of any age. The decoy body 32 displayed in FIG. 4, is attached to a head 34 to form an adult goose decoy 40 and is one embodiment of the decoy of the present invention.

The present invention further includes a kit comprising the three dimensional decoy body 32 that has photographically realistic features and an animal head such as is illustrated at 34 for attachment to the body 32. In one embodiment, the body defines a hole 36. The head 34 terminates in a flange which is not shown, that is insertable into the hole 36.

Unlike previous efforts to construct animal decoys, the method of the present invention actually makes a three dimensional decoy that appears to be a living animal, in a stationary position. Previous efforts directed toward decoy fabrication have produced flat, two-dimensional decoys with a two-dimensional photographic detail or three dimensional decoys lacking the photographic detail. The method of the present invention, which produces three-dimensional decoys with realistic, photographic detail, is readily adaptable to mass production of the realistic three dimensional decoys.

The decoy of the present invention may have a shape of virtually any animal, including ducks of all species, geese of all species, such as Canada geese and Blue geese, turkeys, squirrels, deer or other animals. The animal decoy may be fabricated to have a position such as a resting or swimming position. The decoy may represent an animal at one of an assortment of ages. The method of making the decoy of the present invention and the resulting decoys made by the method permit hunters to create scenes in the field using several decoys realistically presented as, in one instance, a flock of birds such as geese or ducks.

The individual fowl which is photographed for the decoy at 40 in FIG. 4 is photographed to obtain views that include a left side and a right side. Additional photos are taken of a top view, a front view and a rear view of the actual animal. The photos are preferably taken from a common distance so that all views have the same perspective. The views may be taken using a living animal or an animal that has undergone taxidermal treatment.

The photographs may be black and white or may be color photographs. Photographs are preferably taken under similar lighting conditions. The photos are preferably taken with a digital camera. Once taken, the photo images are digitized and scanned into a computer. The computer is programmed with preselected computer-aided design software, such as ADOBE Photo Shop software. Adjustments in lighting and perspective are made by the computer-aided design software to impart consistency to all photographs taken.

The array of photographic views, which are not shown, are arranged with the assistance of the computer-aided design program to make a single view such as is shown at 10 in FIG. 1. The single view 10 is an "aerial, flattened view." By "aerial, flattened view" is meant that the image shown at 10 may be placed on a three-dimensional form, such as a mold as is illustrated at 24 in FIG. 2, and assume the three-dimensional appearance of the body of the animal. Thus, the flattened, two-dimensional image 10 is placed on a three dimensional mold 24 to make the three dimensional image. The "aerial, flattened view" 10 includes corrections incorporated by correcting algorithms, to account for stretching of the aerial view and contraction of the aerial view during molding. These corrections include corrections for shrinking decoy features such as feathers at 16 in order to produce a life-like three dimensional image once the view is printed and molded to form the decoy body 32. The "aerial, flattened view" 10 is also corrected in order to remove any discrepancy among the images used to make the "aerial, flattened view."

The single "aerial, flattened view" of 10 in FIG. 1 is preferably transferred to a screen by a process such as screen printing. The screen printing may be performed by methods that include but are not limited to conventional screen printing techniques, photolithography, and offset printing. The screen, in one embodiment, imparts the aerial flattened view 10 by screen printing to a polymeric sheet that has dimensions of 4 feet×3 feet×⅛ inches thick. The term "polymeric sheet" as used herein refers to a sheet that is made of a material such as polyethylene or polypropylene or other carbon-based material that is capable of being shaped into a decoy body and that can retain the shape and the aerial flattened view. The polymeric sheet is flexible enough to position about the decoy mold 24 but rigid enough to be utilized in a printing process. The plastic polymer used in the sheet is resilient in outdoor conditions and is stretchable when heated. While specific sheet dimensions have been described, it is contemplated that other sheet dimensions are suitable for use, depending upon the size of the decoy. It is also contemplated that more than one image may be printed on each polymeric sheet.

In one embodiment, the screen printing is performed with up to four colors. In another embodiment, a DuoTone color process is employed. For the four color embodiment, the four colors are applied in a conventional four-color printing process. The colors may also be custom blended in order to capture unique plumage coloration or other coloration of a decoy body. Either ultraviolet inks or conventional inks are suitable for use. One type of conventional ink acceptable for use in the method of the present invention is Sericol Screen Ink. These inks are available in a variety of colors and half-tones. Pigments in half tone colors are selected to match Standard Web Offset Printing specifications.

In another embodiment, the screen printing is performed with carbon black to create an image that is black-white and many shades of gray. Carbon black may also be used in the four color array embodiment. In one other embodiment, the screen printing is performed with brown-white shades of colors and shades of gray.

Once the "aerial, flattened view" is transferred onto the screen, the screen is used to screen print the polymeric sheet 22. The polymeric sheet 22 is resilient in a variety of weather and softens in a molding process.

In one embodiment, the screen-printed polymeric sheet 22 is positioned over and around the vacuum decoy mold, illustrated at 24 in FIG. 3a. The vacuum mold 24 encloses a plurality of pinholes positioned about the mold 24. In one embodiment, the mold surface additionally includes raised and recessed topography that corresponds to textural features of the decoy body such as feathers.

Once a vacuum is applied, the screen 22 is held in place about the decoy mold 24 by suction from the holes. The polymer screen 22 is applied to the decoy mold 24 so that two dimensional features printed on the polymer sheet 22 match their position on an actual animal.

While on the decoy body mold 24, the polymeric sheet 22 is heated to a temperature of about 200 degrees Fahrenheit for a time period of about one minute. The heating is effective for softening the sheet 22 without producing any phase change in the sheet. The softened sheet 22 is stretched over the vacuum mold 24 as required, which is in accordance with the computer aided design compensation of the aerial view 10. The softened sheet 22 is subjected to pressure from the decoy body mold 24 and second mold component which is not shown. The second mold component imparts to the decoy body surface, the elevated and recessed detail that simulates features such as feathers.

Once the sheet 22 is softened and shaped over the decoy mold 24, heat and pressure or compression are removed and the sheet cools and hardens. In the hardened shape, the sheet 22 permanently maintains the shape of the three-dimensional decoy mold 24 and becomes the three-dimensional decoy body 32. In one embodiment, the surface of the decoy body is embossed to simulate features such as feathers.

Forming processes other than vacuum molding are suitable for use in the method of the present invention. These molding processes include but are not limited to injection molding. In one other embodiment, a mold is made from a material such as Styrofoam. The printed polymeric sheet is molded around the Styrofoam to make a decoy that has an interior fill, Styrofoam. In particular, the Styrofoam and polymeric sheet are heated so as to anneal and bond together. The Styrofoam-filled decoy may be placed in water and functions as a swimming decoy.

The vacuum molded decoy body 32 is removable from the decoy body mold 24 by pulling off of the mold. The decoy body 32, though hardened, has sufficient elasticity to be removed from the mold.

For animals such as ducks or geese, the decoy body 32 is prepared as described herein. The decoy head 34 is separately fabricated using conventional methods of manufacture. Typically, the decoy head 34 is fabricated by molding a polymeric material. Features such as eyes may be painted onto the decoy head. The decoy head may terminate in a flange that is not shown. The flange is insertable into an orifice 36 defined by the decoy body 32. In one embodiment, the decoy head 34 is reversibly insertable into the decoy body 32. With this embodiment, a hunter may use an array of decoy heads with one decoy body 32. In another embodiment, the decoy head 34 is permanently attached to the decoy body 32.

It is to be appreciated that the decoy of the present invention has been described in particular detail with respect to preferred processes and structures. The preferred method is ideally suited for the described decoy. The present invention, however, is not intended to be limited to these preferred embodiments. One skilled in the art will readily recognize that the actual method may be adjusted to accommodate particular method conditions. The scope of the method and decoy is intended to be defined by the claims which follow.

What is claimed is:

1. A method for making a three-dimensional decoy, comprising:

photographing an animal to obtain an array of photographic views of the animal;

arranging the array of photographic views to create a single, flattened photograph-based view of the animal;

transferring the single, flattened photograph-based view to a screen;

printing the view from the screen onto a polymeric sheet;

providing a three-dimensional decoy mold;

positioning the plastic sheet over the three-dimensional decoy mold; and heating and pressing the sheet with energy effective to soften the sheet so that the sheet takes the shape of the decoy mold.

2. The method of claim 1 and further including digitizing the array of photographic views.

3. The method of claim 1 wherein the polymeric sheet is a polyethylene sheet.

4. The method of claim 1 wherein the sheet is heated to a temperature of about 200° F.

5. The method of claim 1 and further including cooling the decoy formed sheet.

6. The method of claim 5 and further including removing the decoy formed sheet from the decoy mold.

7. The method of claim 1 wherein the flattened view is formed with computer aided design.

8. The method of claim 1 wherein the sheet is bonded to a mold comprised of a material such as Styrofoam.

9. The method of claim 1 wherein the sheet is formed about the mold with a vacuum.

10. The method of claim 1 wherein the flattened view is corrected to accommodate changes in sheet material such as stretching.

11. The method of claim 1 and further including embossing a surface of the polymeric sheet.

* * * * *